United States Patent [19]

Okubo et al.

[11] Patent Number: 5,169,825
[45] Date of Patent: Dec. 8, 1992

[54] AMMONIUM ION- AND AMMONIA-SELECTIVE ADSORBENT AND PROCESS FOR PREPARATION OF SAME

[75] Inventors: Akira Okubo, Tokushima; Toshihiro Kamewa, Komatsushima; Hironobu Hayashi, Tokushima; Keiko Miyawaki, Naruto, all of Japan

[73] Assignee: Tomita Pharmaceutical Co., Ltd., Tokushima, Japan

[21] Appl. No.: 768,890

[22] PCT Filed: Sep. 10, 1990

[86] PCT No.: PCT/JP90/01153
§ 371 Date: Oct. 28, 1991
§ 102(e) Date: Oct. 28, 1991

[87] PCT Pub. No.: WO91/12885
PCT Pub. Date: May 9, 1991

[30] Foreign Application Priority Data

Feb. 28, 1990 [JP] Japan ................................. 2-50408

[51] Int. Cl.$^5$ .......................... B01J 20/10; B01J 20/30
[52] U.S. Cl. ................................... 502/407; 502/235; 423/237; 210/903
[58] Field of Search .................... 502/405, 407, 235; 423/237; 210/903

[56] References Cited

U.S. PATENT DOCUMENTS 3,056,657 10/1962 Nowak ............................. 423/237
3,453,077 7/1969 Hyde .............................. 502/407
4,290,895 9/1981 Iwamoto ......................... 210/903

FOREIGN PATENT DOCUMENTS 132465 11/1978 Japan ............................. 423/237
1000772 9/1965 United Kingdom ............... 423/237

Primary Examiner—Carl F. Dees
Attorney, Agent, or Firm—Larson and Taylor

[57] ABSTRACT

The present invention provides an ammonium ion- and ammonia-selective adsorbent.

According to the invention, an ammonium ion-selective adsorbent can be obtained by introducing alkali metal ions capable of ion exchange into a silica-alumina composite oxide having a specific composition, the obtained adsorbent being capable of selectively adsorbing ammonium ions and ammoniacal nitrogen without affecting other components in seawater as well as fresh water, and being capable of keeping the pH value of seawater varied within an extremely narrow range.

The adsorbent of the invention is also useful as an adsorbent for adsorption of ammonia gas.

5 Claims, 1 Drawing Sheet

AMMONIUM ION- AND AMMONIA-SELECTIVE ADSORBENT AND PROCESS FOR PREPARATION OF SAME

FIELD OF THE INVENTION

The present invention relates to an adsorbent which is capable of selectively adsorbing ammonium ions and ammonia (hereinafter referred to as "ammonium ions" unless required to be otherwise indicated), and a process for preparing the same.

The term "rate of ammonium ion adsorption" used herein refers to a rate given by the following equation:

$$\text{Rate of adsorption } (\%) = \frac{\text{Initial conc. (ppm)} - \text{equilibrium conc. (ppm)}}{\text{Initial conc. (ppm)}} \times 100$$

BACKGROUND ART

In recent years, there has arisen a question of how to purify water for use in keeping aquarium fishes and living fishes or in transporting living fishes. If the ammonia derived from decomposed excretion of aquarium fishes or feed leftovers is present in water at a concentration exceeding 10 ppm, it would exert a detrimental action on the central nerve system of fishes, resulting in increase of their mortality.

Silicone-coated zeolites have been used as ammonium-ion adsorbents in an attempt to obviate the above problem (Japanese Examined Patent Publication Sho 54-39279). However, such adsorbents act to adsorb about 7% of calcium ions and magnesium ions and are therefore unsuitable for use with seawater as a medium.

Na-type zeolites have been used as ammoniacal nitrogen adsorbents (Japanese Unexamined Patent Publications Sho 53-27387 and Sho 53-131291). These adsorbents are intended to utilize the selectivity of cation ion exchange. Yet due to the selectivity of $K^+ \approx C^{2+}$, $Mg^{2+} > NH_4^+ > Na^+$, the adsorbents used in seawater rich in alkaline earth metal ions are unnegligibly inhibited from adsorbing ammonium ions by calcium ions and magnesium ions.

Conventional adsorbents have various problems to be resolved as described above. Especially there is a strong demand for the development of adsorbents which are capable of selectively and efficiently removing ammonium ions from seawater without likelihood of adversely affecting other seawater components and fishes.

It is an object of the invention to provide an adsorbent capable of selectively adsorbing ammonium ions which is free from the loss due to its dissolution when adsorbing and removing ammonium ions and ammoniacal nitrogen from not only fresh water but seawater, and which is capable of selectively adsorbing only ammonium ions without adsorption of calcium ions, magnesium ions and other mineral components in seawater, is capable of keeping the pH value of seawater varied in an extremely narrow range, and is inexpensive and highly safe, and a process for preparing the same.

DISCLOSURE OF THE INVENTION

The above object of the invention can be achieved as described below.

According to the invention, there are provided:

(1) an ammonium ion- and ammonia-selective adsorbent which comprises $SiO_2$ and $Al_2O_3$ in a molar ratio of between 2.5/1 and 25/1, and which contains 0.05 to 3 moles of alkali metal ions capable of ion exchange per mole of $Al_2O_3$, (2) an ammonium ion- and ammonia-selective adsorbent prepared by calcining the adsorbent as defined above in item (1) at a temperature of 150° to 400° C., (3) a shaped body of adsorbent containing not less than 5 w/w % of the ammonium ion-selective adsorbent as defined above in item (1) or (2), (4) a process for preparing an ammonium ion- and ammonia-selective adsorbent, comprising the steps of: adding dropwise to water an aluminum salt or an aluminate and a silicate provided in $SiO_2/Al_2O_3$ molar ratio of between 2/1 and 20/1 in an alkalinity pH range of 8 to 12; and adjusting the pH of the reaction mixture to 4 to 9 with an acid solution, and (5) a process for preparing an ammonium ion- and ammonia-selective adsorbent, comprising calcining the adsorbent prepared by the process of item (4) at a temperature of 150° to 400° C.

A silica-alumina composite oxide is used as the starting material for the adsorbent of the invention. In the invention, the silica can effectively increase the specific surface area, and the aluminum can effectively enlarge the adsorption volume for ammonium ions. The p orbitals of aluminum element include empty orbitals capable of accepting electrons which can accommodate lone pairs of electrons in nitrogen atoms of ammonium ions. Namely the aluminum atoms function as an acceptor for lone pairs of electrons in nitrogen atoms of ammonium ions. The adsorbent of the invention is composed of a composite oxide so that the silica-alumina ratio in the oxide affects the state of molecular orbitals formed through the μ-hydroxo bridge of oxygen and hydrogen atoms and the oxo bridge of oxygen atoms between silicon and aluminum atoms and is reflected by the function of aluminum atoms as an electron acceptor. Therefore the maximum ammonium-adsorbing volume can be afforded by selecting a suitable $SiO_2/Al_2O_3$ molar ratio. When alkali metal ions which, when hydrated, is virtually equal to or greater than the hydrated ammonium ions in radius are introduced into a composite oxide, the ammonium ions are selectively adsorbed in voids formed by the removal of alkali metal ions from the adsorbent, that is to say, the adsorbent is rendered able to selectively adsorb ammonium ions. Further, when the silica-alumina composite oxide is calcined, there occurs condensation involving dehydration to condense the hydroxyl groups bonded to silicon atoms and aluminum atoms or the hydroxyl groups of μ-hydroxo bridge, whereby an oxobridge is formed. During the reaction, the protons capable of ion exchange which are present in the composite oxide are converted into water molecules and removed from the adsorbent, thereby inhibiting the proton-ammonium ion exchange and preventing the variation in pH of seawater to an acidity level which would occur on addition of adsorbent to seawater.

Examples of the $Al_2O_3$ source in the silica-alumina composite oxide are aluminum salts such as aluminum nitrate, aluminum sulfate, aluminum chloride and aluminum acetate; aluminates such as sodium aluminate, potassium aluminate and lithium aluminate; etc. These substances can be used singly or at least two of them are usable in mixture.

Examples of the $SiO_2$ source are silicates such as sodium silicate, potassium silicate and lithium silicate. These silicates can be used singly or at least two of them are usable in mixture.

The $Al_2O_3$ source and the $SiO_2$ source are used in the form of an aqueous solution. The aluminum salt solution has a concentration of about 1 to about 20 w/w %, preferably about 5 to about 10 w/w %, more preferably about 8 w/w %, calculated as $Al_2O_3$. The aluminate solution has a concentration of about 1 to about 30 w/w %, preferably about 15 to about 25 w/w %, more preferably about 20 w/w %, calculated as $Al_2O_3$. The silicate solution has a concentration of about 1 to about 35 w/w %, preferably about 25 to about 30 w/w %, more preferably about 29 w/w %, calculated as $SiO_2$.

According to the invention, added dropwise to water are the $SiO_2$ and $Al_2O_3$ sources adjusted to a molar ratio of between about 2/1 and about 20/1 in an alkalinity pH range of about 8 to about 12. Examples of pH adjustors which are used to retain the pH of $Al_2O_3$ and $SiO_2$ sources in the alkalinity pH range during the dropwise addition thereof are sodium hydroxide, potassium hydroxide, lithium hydroxide and like alkali sources. According to the invention, the reaction mixture resulting from dropwise addition of $Al_2O_3$ and $SiO_2$ sources in the alkalinity pH range is adjusted to a pH of about 4 to about 9 with an acid solution, whereby the desired product is formed and precipitated. Examples of useful acid solutions are hydrochloric acid, sulfuric acid, nitric acid, etc.

Temperatures for preparing the reaction mixture in the step are not specifically limited and may be room temperature. It is preferred to prepare the reaction mixture at a temperature of 50° C. or lower in view of the reaction rate.

The obtained precipitate is separated, and is washed with water and dried in the conventional manner, giving an ammonium ion-selective adsorbent.

In accordance with the invention, the thus obtained adsorbent may be calcined to achieve improvements. A preferred calcining temperature is in the range of about 150° to about 400° C.

The ammonium ion-selective adsorbent prepared according to the invention has an $SiO_2$ and $Al_2O_3$ molar ratio of between about 2.5/1 and about 25/1, and contains 0.05 to 3 moles, preferably about 0.08 to about 2.2 moles, of alkali metal ions capable of ion exchange, such as sodium ions, potassium ions or lithium ions, per mole of $Al_2O_3$. The alkali metal ions are derived from the alkali source used as the pH adjustor in the above process or from the aluminate and/or silicate used as the $SiO_2$, source or $Al_2O_3$ source.

The ammonium ion-selective adsorbent of the invention can be used to adsorb ammonium ions in a liquid and an ammonia gas in the atmosphere. The adsorbent of the invention is also useful for removing ammonium ions from seawater or fresh water and finds uses as an ammonium ion adsorbent for an artificial kidney in the medical art, or as an ammonia gas adsorbent in pollutant treatment and in industrial applications.

For the above applications, the ammonium ion-selective adsorbent of the invention can be used in the form of a powder or a paste obtained by adding a solvent, and can be used in other various forms. For example, the adsorbent of the invention can be made into granules, pellets or the like by adding an organic or inorganic binder or into globules by spray drying. Optionally functional papers or fibers can be formed by adding the adsorbent to papers and fibers, or plastic moldings can be formed by admixing the adsorbent with a resin component. More specifically, ammonium ions can be adsorbed, for example, by circulating seawater or fresh water in a column charged with the adsorbent or by immersing the above plastic molding in seawater or fresh water. The adsorbent may be enclosed with an air-permeable papers or fibers or added to papers or fibers as stated above to serve as a filtering component in a mask or filter for adsorbing an ammonia gas.

The ammonium ion-selective adsorbent of the invention can adsorb ammonium ions at a high adsorption rate of about 20 to about 50%, and is free of loss due to its dissolution in seawater or fresh water and is excellent in the ability to selectivity adsorb ammonium ions without likelihood of adversely affecting other components than ammonium ions. Suspended in seawater, the adsorbent of the invention is varied in the pH in an extremely narrow range of about 0.5 or less, hence is highly safe.

The present invention will be described below in more detail with reference to the following examples.

EXAMPLE 1

To 1.5 l of water maintained at 50° to 60° C. were added dropwise 0.5 l of an aqueous solution of aluminum sulfate containing 8 w/w % of aluminum, calculated as $Al_2O_3$, and 1.22 l of an aqueous solution of sodium silicate containing 29 w/w % of silicon, calculated as $SiO_2$ which were adjusted to the contemplated ratio (i.e. $SiO_2/Al_2O_3$ molar ratio of 15/1) and 20 ml of an aqueous solution of potassium hydroxide which was adjusted to bring the resulting reaction mixture to an alkalinity pH range. After the addition, the reaction mixture was heated to 80° C and stirred for 3 hours. Thereafter the pH of the reaction mixture was adjusted to the range of neutrality using a 1:2 mixture by weight of nitric acid and water. The obtained product was aged in the mother liquor at room temperature overnight. The resulting precipitate was filtered, washed with water and dried at 80° C., giving 618 g of a sample. The obtained sample was found to have an ammonium ion adsorption rate of about 20%.

EXAMPLE 2

The same procedure as in Example 1 was repeated with the exception of adjusting the $SiO_2/Al_2O_3$ molar ratio to 10/1, giving a sample. The obtained sample was found to have an ammonium ion adsorption rate of about 20%.

EXAMPLE 3

A sample was obtained in the same manner as in Example 1 with the exception of adjusting the $SiO_2/Al_2O_3$ molar ratio to 5/1. The sample was found to have an ammonium ion adsorption rate of about 20%.

EXAMPLE 4

The same procedure as in Example 1 was repeated with the exception of adjusting the $SiO_2/Al_2O_3$ molar ratio to 2.6/1, giving a sample. The sample was found to have an ammonium ion adsorption rate of about 20%.

EXAMPLE 5

Figure 1:
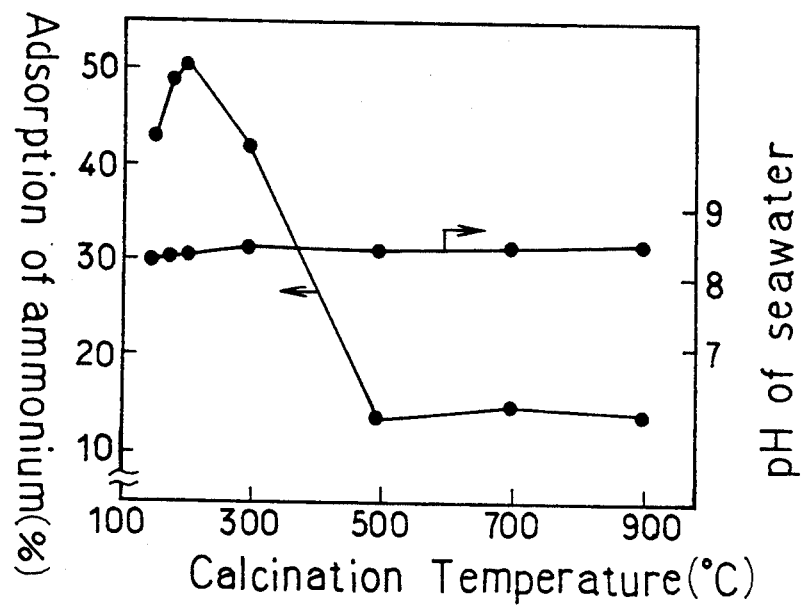
FIG. 1 is a graph showing the relationship between the temperature for calcining the product of the invention (Example 3) and the ammonium ion adsorption rate or the pH of seawater.

An ammonium ion-adsorption test was conducted by the following method using the sample obtained in Example 3 for adsorption in seawater to investigate the relationship between the calcining temperature and the ammonium ion adsorption rate or the pH of seawater. One gram of the adsorbent was added to natural seawater (100 ml) containing ammonium ions in a concentration adjusted to 10 ppm with ammonium hydroxide. The resulting mixture was stirred at 25° C. for 1 hour. Thereafter, the concentration of ammonium ions in the supernatant liquid was measured by an ion analyzer with use of ammonium ion-selective electrodes. The amount of adsorbed ammonium ions was calculated from the difference in the concentration of ammonium ions between in the initial state and in an equilibrium state of adsorption. The pH of the seawater in the equilibrium state of adsorption was measured at the same time by a pH meter. The seawater used in the test had a pH of about 8.5 prior to the addition of the adsorbent. The adsorbent was produced by calcining the sample obtained in Example 3 at the predetermined temperature (150° to 900° C.) for 3 hours in an electric furnace. FIG. 1 shows the test results. When the sample was calcined at 150° to 300° C., the ammonium ion adsorption rate thereof increased to at least two times that determined before the calcination. When the sample was calcined at 500° C. or higher, the ammonium ion adsorption rate thereof was decreased to about half of that determined before the calcination. In case of calcining the sample at 150° to 300° C., the pH of the seawater in the equilibrium state of adsorption varied within the range of about ±0.5 from that determined before the adsorption. This level of variation will not cause any problem in use of the adsorbent. The above facts show that the calcination of the sample at 150° to 300° C. provides excellent results in adsorption of ammonium ions and the variation of the pH of seawater.

EXAMPLE 6

Figure 2:
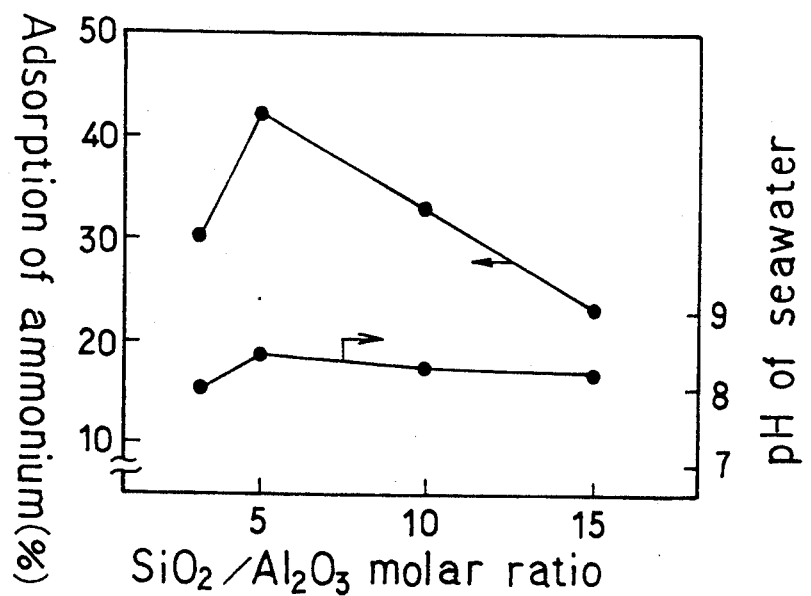
FIG. 2 is a graph showing the relationship between the $SiO_2/Al_2O_3$ molar ratio of starting materials and the ammonium ion adsorption rate or the pH of seawater.

In order to obtain the optimum ratio of starting materials (molar ratio of $SiO_2/Al_2O_3$) in adsorption of ammonium ions from seawater, an ammonium ion-adsorption test was conducted according to the test method described in Example 5 using the samples prepared in Examples 1 to 4. The adsorbents used were those obtained under the conditions which were recognized as suitable in Example 5, namely by calcining the samples of Examples 1 to 4 at 300° C. for 3 hours. The seawater used in the test had a pH of about 8.5 before the addition of the adsorbent. FIG. 2 shows the test results, and Table 1 shows the results obtained by chemical analysis of the adsorbents. The ammonium ion adsorption rate and the variation of the pH of seawater were satisfactory in all cases. In particular, the adsorbent prepared by adjusting the $SiO_2/Al_2O_3$ molar ratio to 5/1 gave excellent results.

TABLE 1

|  | Example No. | | | |
|---|---|---|---|---|
|  | 1 | 2 | 3 | 4 |
| $Al_2O_3$ (v/v %) | 6.61 | 9.59 | 15.10 | 24.38 |
| $SiO_2$ (v/v %) | 75.56 | 67.28 | 54.11 | 44.07 |
| $SiO_2/Al_2O_3$ molar ratio | 19.40 | 11.90 | 6.10 | 3.07 |

TABLE 1-continued

|  | Example No. | | | |
|---|---|---|---|---|
|  | 1 | 2 | 3 | 4 |
| $K/Al_2O_3$ molar ratio | 0.08 | 1.01 | 1.40 | 0.92 |
| Alkaline metal ion/$Al_2O_3$ molar ratio | 2.20 | 1.95 | 1.75 | 1.02 |
| Reduced amount by drying (v/v %) | 8.57 | 9.04 | 9.24 | 7.67 |

*Alkaline metal ion = total alkaline metal ions

EXAMPLE 7

A sample was prepared in the same manner as in Example 1 with the exception of adjusting the $SiO_2/Al_2O_3$ molar ratio to 5/1 and using sodium hydroxide as a pH adjuster in place of potassium hydroxide. The ammonium ion adsorption rate of the sample and the variation in the pH of seawater were determined in the same manner as in Example 5. The results were that the ammonium ion adsorption rate was 46% and the variation of the pH was −0.19.

The results of the chemical analysis of the sample are shown below in Table 2.

EXAMPLE 8

A sample was prepared in the same manner as in Example 1 with the exception of adjusting the $SiO_2/Al_2O_3$ molar ratio to 5/1 and using lithium hydroxide as a pH adjustor in place of potassium hydroxide. The ammonium ion adsorption rate of the sample and the variation in the pH of seawater were determined in the same manner as in Example 5. The results were that the ammonium ion adsorption rate was 49% and the variation of the pH was +0.01.

The results of chemical analysis of the sample are shown below in Table 2.

TABLE 2

|  | Example No. | |
|---|---|---|
|  | 7 | 8 |
| $Al_2O_3$ (v/v %) | 15.47 | 16.08 |
| $SiO_2$ (v/v %) | 55.44 | 57.13 |
| $SiO_2/Al_2O_3$ molar ratio | 6.07 | 6.02 |
| Na, Li/$Al_2O_3$ molar ratio | Na/$Al_2O_3$ 1.88 | Li/$Al_2O_3$ 0.62 |
| Alkaline metal ion/$Al_2O_3$ molar ratio | 1.89 | 2.10 |
| Reduced amount by drying (v/v %) | 7.27 | 5.01 |

*Alkaline metal ion = total alkaline metal ions

EXAMPLE 9

An adsorption test was carried out by the following method to attempt adsorption of calcium ions, magnesium ions, sodium ions and potassium ions as other ions than ammonium ions present in seawater.

One gram of an adsorbent was added to natural seawater (100 ml) having a concentration of ammonium ions adjusted to 10 ppm with ammonium hydroxide. The resulting mixture was stirred at 25° C. for 1 hour. Thereafter, the concentration of each ion in the supernatant liquid was measured by an atomic absorption spectrophotometry. The adsorbent used was one obtained by calcining the sample produced in Example 3 at 200° C. for 3 hours. Table 3 shows the results. The results shown in Table 3 indicate that the concentrations of calcium ions, magnesium ions and sodium ions remained within the range of measurement errors before and after the addition of the adsorbent, showing that the adsorbent caused no adsorption. On the other hand, the concentration of potassium ions in the seawater increased from 0.035 w/v % to 0.085 w/v % during the adsorption of ammonium ions by the adsorbent. This revealed that ammonium ions were adsorbed chiefly by the ion exchange with potassium ions and that the content of potassium ion in the adsorbent affects the amount of ammonium ions to be adsorbed. Further, recognized was that the adsorbents obtained according to the present invention had an ability to selectively adsorb ammonium ions, but not an ability to selectively adsorb other mineral components of the seawater.

TABLE 3

|  | Before addition of adsorbent | After addition of adsorbent |
|---|---|---|
| Concentration of $Ca^{2+}$ | 0.038 w/v % | 0.037 w/v % |
| Concentration of $Mg^{2+}$ | 0.140 w/v % | 0.140 w/v % |
| Concentration of $Na^+$ | 0.980 w/v % | 0.970 w/v % |
| Concentration of $K^+$ | 0.035 w/v % | 0.035 w/v % |
| pH of seawater | 8.56 | 8.51 |

EXAMPLE 10

A polyethylene resin (trade name: "Mirason 403P", product of Mitsui Petrochemical Industries, Ltd.) serving as a thermoplastic resin was added to the adsorbent of Example 3. The mixture was kneaded by heated roll under the following conditions, giving a shaped sheet of adsorbent:

| Mixture: Mirason 403P | 100 parts |
|---|---|
| Adsorbent (Example 3) | 100 parts |
| Temperature: temperature for heated roll | 135° C. |

The shaped adsorbent thus obtained was cut to 3 mm × 3 mm, giving a specimen. Using this specimen, an ammonium ion-adsorption test was conducted in natural fresh water.

The ammonium ion adsorption rate of this specimen was about 60% and the variation of the pH was +0.18. That is, good results were obtained.

COMPARISON EXAMPLE 1

An adsorption test was carried out in the same manner as in Example 5 using a commercially available adsorbent for adsorption of ammonium ions (natural porous mineral, cristobalite: crystalline silica).

The commercial product was found to achieve an ammonium ion adsorption rate of about 10% which was far lower than when the product of the present invention was used.

We claim:

1. An ammonium ion- and ammonia-selective adsorbent which comprises $SiO_2$ and $Al_2O_3$ in a molar ratio of between 2.5/1 and 25/1, and which contains 0.05 to 3 moles of alkali metal ions capable of ion exchange per mole of $Al_2O_3$.

2. An ammonium ion- and ammonia-selective adsorbent according to claim 1 which is prepared by calcining the adsorbent of claim 1 at a temperature of 150° to 400° C.

3. A shaped body of adsorbent containing not less than 5 w/w % of the ammonium ion-selective adsorbent as defined in claim 1.

4. A process for preparing an ammonium ion- and ammonia-selective adsorbent, comprising the steps of: adding dropwise to water an aluminum salt or an aluminate and a silicate provided in $SiO_2/Al_2O_3$ molar ratio of between 2/1 and 20/1 in an alkalinity pH range of 8 to 12; and adjusting the pH of the reaction mixture to 4 to 9 with an acid solution.

5. A process for preparing an ammonium ion- and ammonia-selective adsorbent, comprising calcining the adsorbent prepared by the process of claim 4 at a temperature of 150° to 400° C.

* * * * *